Nov. 29, 1966   L. N. LIEBERMANN ET AL   3,287,973
AIR VOLUME FLOWMETER
Filed Jan. 28, 1964   2 Sheets-Sheet 1
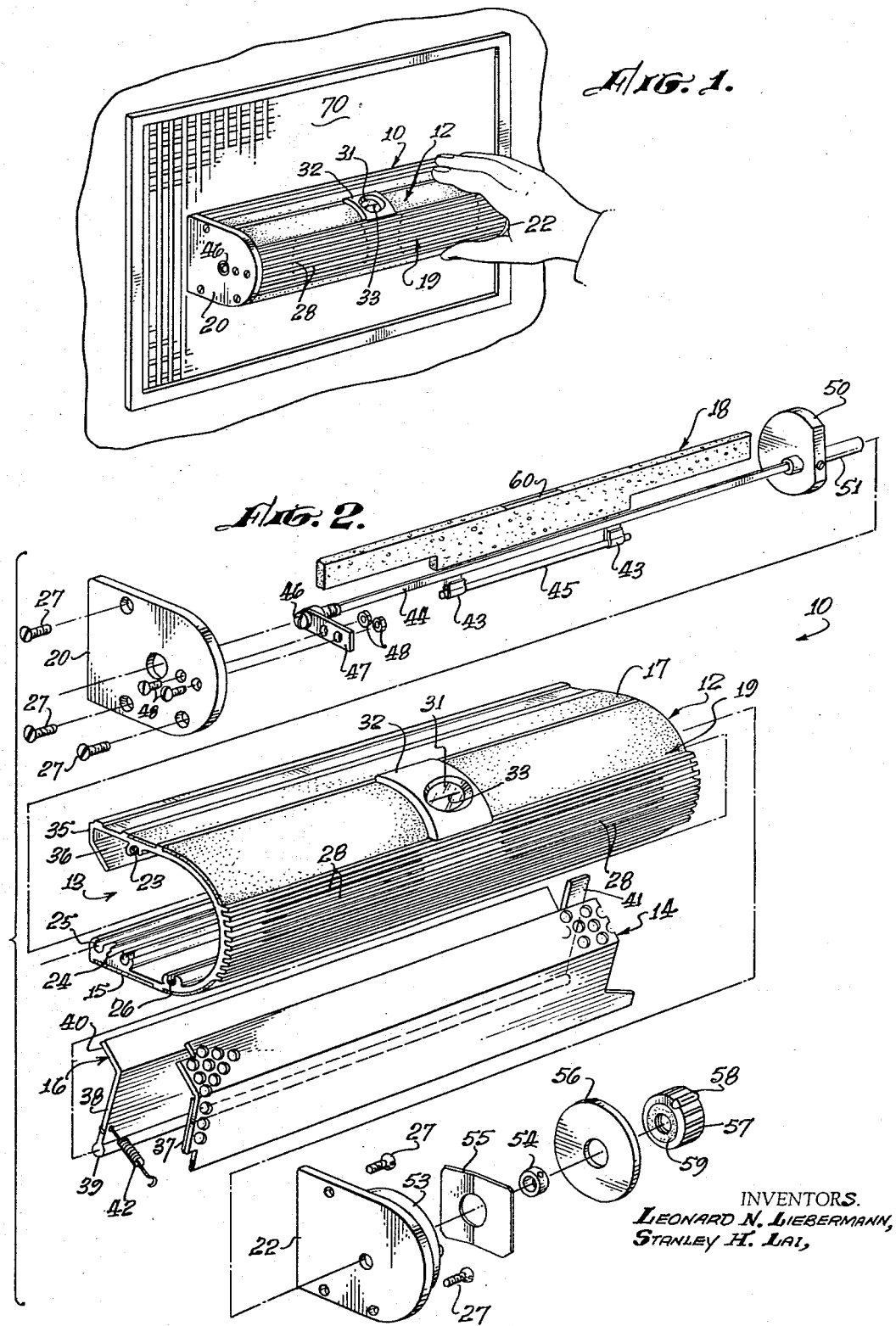
INVENTORS.
LEONARD N. LIEBERMANN,
STANLEY H. LAI, Nov. 29, 1966  L. N. LIEBERMANN ET AL  3,287,973
AIR VOLUME FLOWMETER
Filed Jan. 28, 1964  2 Sheets-Sheet 2
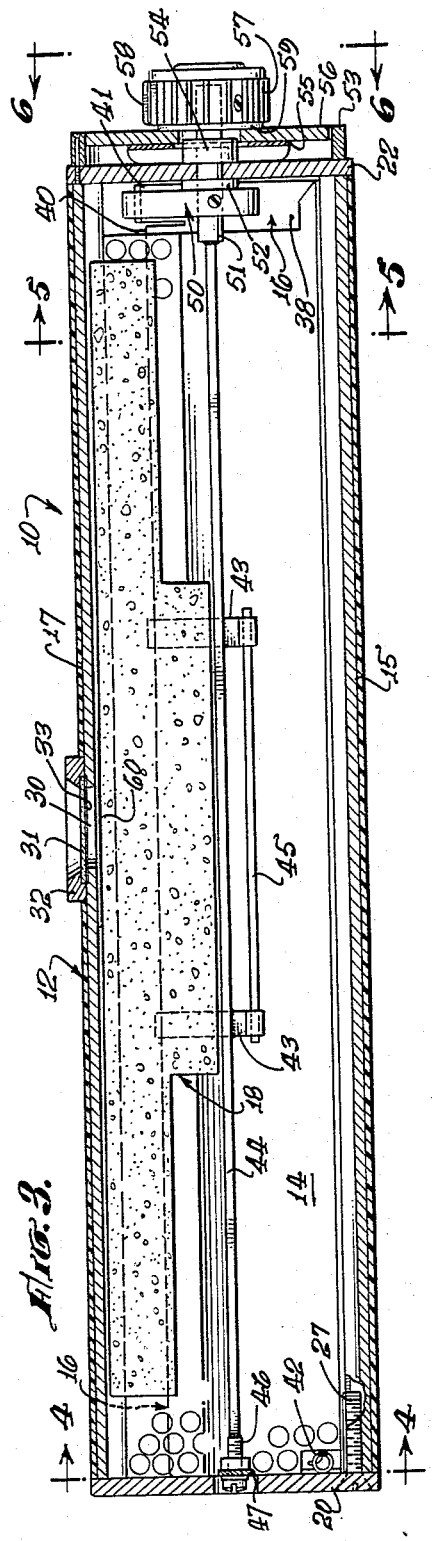
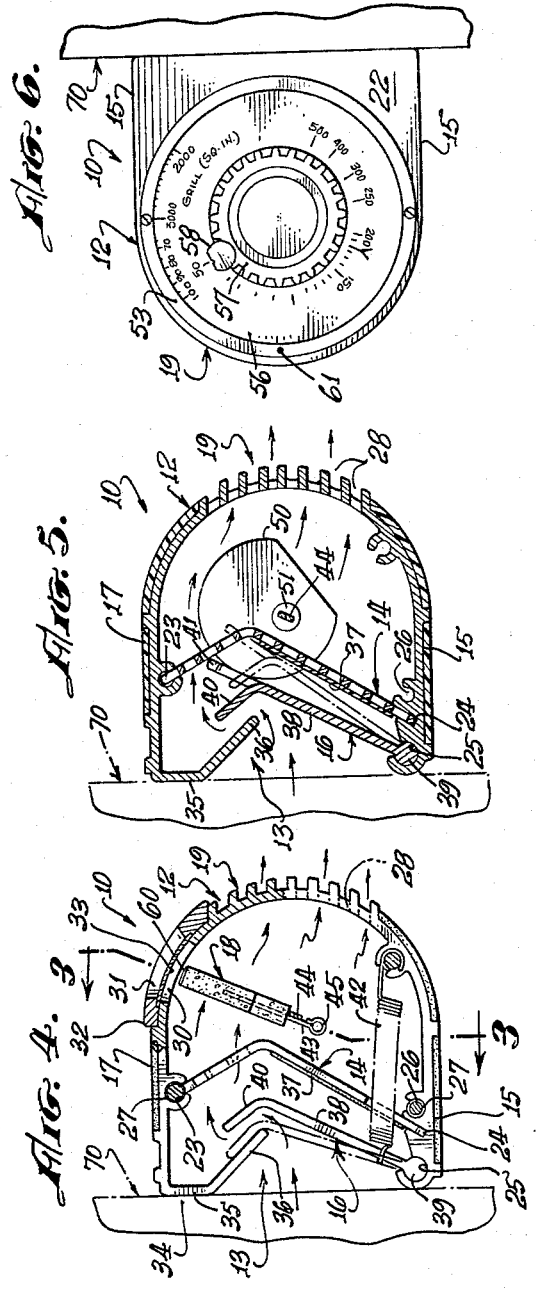
LEONARD N. LIEBERMANN,
STANLEY H. LAI,
INVENTORS.

United States Patent Office 3,287,973
Patented Nov. 29, 1966

3,287,973
AIR VOLUME FLOWMETER
Leonard N. Liebermann, 2644 Ellentown Road, La Jolla, Calif., and Stanley H. Lai, 4164 Hill St., San Diego, Calif.
Filed Jan. 28, 1964, Ser. No. 340,689
3 Claims. (Cl. 73—228)

This invention relates generally to flow measurement instruments and particularly to an air or other gaseous medium volume flowmeter.

In measuring air flow through or emanating from ventilating or air conditioning systems, it has heretofore been the practice to measure the velocity of the air flow through a duct and then calculate the volume of flow by measuring the cross-section of the duct and multiplying that figure by the air velocity. Such known velocity meters depend upon principles of operation including hot wires, rotors or rotameters, vanes and levitation of a ball in a coned receptacle. Such velocity meters are actually highly inefficient due to the difficulty in measuring a velocity that can be considered truly representative of an average velocity through the duct. Volume measurements calculated from duct measurement and indicated air velocities are also highly erroneous due to variations in duct size throughout the system, the presence of obstruction in the ducts, and the presence of a grill installed at the outlet. Errors in calculation also are quite possible.

The principal object of our invention therefore is to provide an instrument which will accurately measure volume of flow in calibrated units.

Another object of our invention is to provide a readily portable meter that will directly indicate volume of flow in any gaseous fluid system.

A further object of our invention is to provide an air volume flowmeter which is relatively simple, easy to construct, and reasonable in price.

A still further object of our invention is to provide an air volume flowmeter that can be readily calibrated and can be adjusted for grill factor.

Other objects, advantages, and novel features of the invention will become apparent from the following detailed description of the invention when considered in conjunction with the accompanying drawings wherein:

FIGURE 1 is a perspective view of one mode of use of our invention in juxtaposition to a ventilating grill;

FIG. 2 is an exploded view in perspective of the various parts comprising the invention;

FIG. 3 is a cross-sectional view of the invention;

FIG. 4 is a cross-sectional end elevation taken on the line 4—4 of FIG. 3;

FIG. 5 is a cross-sectional end elevation taken on the line 5—5 of FIG. 3; and

FIG. 6 is an end elevation taken on the line 6—6 of FIG. 3.

With reference to the various figures, the air volume flowmeter 10 comprises a housing 12, a perforated fixed angular baffle plate 14, a movable angular damper plate 16, a movable vane 18, and end plates 20 and 22.

Housing 12 may be an extruded aluminum or plastic shape having a generally open bottom portion 13, straight sides 15 and 17, and a generally semi-circular curved top portion 19. Five grooved sections are formed interiorly of the housing for reception and retention of the various parts. Grooves 23 and 24 are provided for the reception of the baffle plate 14. Groove 25 is provided for the reception of the movable damper plate 16. Grooves 26 are provided with threaded apertures at each end for receiving one of the end plate holding screws 27. Groove 23 is also provided with threaded portions at each end for the same purpose. A series of small channels 28 is shown milled or formed in the semi-circular top portion 19 of housing 12. As indicated in FIGS. 2, 4, and 5, with the exception of the end portions 19a, 19c, and central portion 19b, these channels are sunk through the material forming a series of long rectangular openings through which air may escape.

Substantially centrally of one side of the housing, a sighting aperture 30 is provided which is covered with a curved glass or plastic cover 31 having a horizontal cross wire or line 33 formed thereon. Cover fitting 32 is provided to protect cover 31 and to secure it in place. The cover fitting 32 itself may be secured against the side of the housing by cement, screws, rivets or other suitable means.

Extending inwardly from the bottom of side 17 of the housing 12 is bottom member 34 which is an integral portion of the housing 12 and comprises two portions, a bottom portion 35 which extends substantially at right angles to the side 17, partially across the opening 13, and an angular portion 36 which extends upwardly into the interior of the housing 12 to cooperate, as will be explained later in more detail, with the damper plate 16 to control the flow of air through the instrument.

The fixed angular perforated baffle plate 14 is secured in grooves 23 and 24 and principally serves to direct the incoming air up one side of the housing. A light screen 37, such as imperforated tape or foil, is secured, adhesively or otherwise, to the lower side of one of the angular portions of the baffle plate. This screen insures the air flow being directed upwardly along one interior side of the housing and prevents any back flow impinging on the upper portion of the movable vane 18. While the portion of the baffle plate normally covered by the screen could actually be left imperforated, ease and facility of manufacture dictate that the baffle plate be cut from large perforated sheets.

The movable damper plate 16 is hingedly supported in groove 25. As shown, this damper plate 16 is an extruded angular structure consisting of one portion 38 terminating at one end in a hinge portion 39 and at the other end in a bent angular portion 40. This latter portion is bent at an angle that will match the angular portion 36 of the housing 12 so that damper plate 16 when closed downwardly will effectively seal opening 13 and prevent air from passing through the instrument.

At one end of the damper plate 16, a follower tab 41 is provided for cooperation with cam 50. This tab 41 may be formed coplanar with portion 38 of the damper plate 16 or may be bent slightly, one way or the other to best follow the camming portion of cam 50. A light tension spring 42 is connected at the end of damper plate 16 opposite the tab bearing end between the portion 38 and one of the end plates holding screws 27 inserted in threaded groove 26. This spring holds the damper plate in the open position with the follower tab 41 firmly contacting the cam 50.

The vane 18 which may be formed from lightweight plastic foam material or other lightweight material is secured by inserted tabs 43 to a supporting spring steel torsion strip 44. A counterbalancing rod 45 is secured to the ends of tabs 43 so as to counterbalance vane 18 around the torsion spring 44.

Torsion spring 44 is secured at one end to cam shaft 51 and at the other end to tension adjusting screw 46. This latter screw 46 is fastened to leaf spring 47 which in turn is secured to end plate 20 by screws and nuts 48. Thus, when torsion spring 44 is installed between the end plates 20 and 22, the end of the torsion spring is fixed by screw 46, usually in a horizontal position where a flat strip is used, and after the positioning of the other parts on the cam shaft 51 in conjunction with the end plate 22, the tension on the torsion spring may be adjusted by the leaf spring 47.

The parts mounted on or adjacent the cam shaft 51 are, in order from the interior of the housing 12 outwardly, cam 50, washer 51, end plate 22, circular spacer 53, collar 54, dished spring plate 55, dial 56, and knob 57. This knob 57 carries a marker 58 and is furnished with a facing 59 of cork or other friction affording type of material. As will be noted, cam 51, collar 54, and knob 57 can all be affixed to cam shaft 51 by set screws. Circular spacer 53, which forms a housing for the dished spring 55, the collar 54 and dial 56 is secured to the end plate 22 by small screws.

It should be noted here that vane 18 has an horizontal marker 60 affixed to the central portion of its free edge, so situated that it may, under conditions of operation, be aligned with the cross wire 33 in the cover 31. Also, it should be noted that cam 50, while partly circular in configuration, is installed eccentrically with relation to cam shaft 51. As the cam is turned one direction of rotation or the other, its camming peripheral surface will either close the damper completely against the force of the spring 42 or will allow it to open to its full extent.

Dial 56 carries two sets of indicia. The inner circular set indicates grill area in square inches and is used in conjunction with the marker 58 on the knob 57. The outer circular set indicates either air volume in cubic feet per minute or, under certain circumstances, indicates air velocity in feet per minute. This outer set indicates and is used in conjunction with the mark 61 on the circular spacer 53. It will be noted that both sets of indicia are in the form of circular logarithmic scales which have been found, by empirical methods, to give true readings of the quantities measured.

When initially adjusting the instrument for its intended use, the instrument is placed on a duct grill from which an air stream is issuing having a known low velocity, say 200 feet per minute. Cam shaft 51 is turned so that marker 60 on vane 18 coincides with cross wire 33 with cam 50 rotated so that camming action does not occur, leaving the damper plate 16 completely open. Dial 56 and knob 57 are rotated until the inner and outer circle indicia correctly read the known grill size and air volume. Knob 57 is then fastened in this position to cam shaft 51 with set screw. The low air velocity is then raised to a considerably higher value, i.e., 800 feet per minute. Dial 56 and knob 57 are then rotated in unison to read indicia yielding known grill size and air volume. In general, marker 60 will be found not to coincide with cross wire 33 in this new position. Cam 50 is now rotated on cam shaft 51 causing damper plate 16 to close deflecting vane 18 until marker 60 yields coincidence with cross wire. Cam 50 is now fastened to cam shaft 51 with set screw in this position. Correct cam shape or correct eccentricity in the case of a semi-circular cam will now yield true values for all readings at intermediate velocity. The actual cam shape or eccentricity is thus determined empirically.

In operation, the instrument is placed with its bottom portion 13 against the grill 70 as shown in FIG. 1. Preferably, as shown, in connection with a rectangular grill, the long way of the instrument is placed parallel to the long axis of the grill. On a circular grill, the instrument can be placed in any position. Prior to application of the instrument to the grill, the dial 56 is held manually while the knob is set to give a reading on the inner scale equal to the area of the grill in square inches. Then the instrument is placed against the grill and the knob turned until the marker on the vane corresponds with the cross wire 33. During this second movement of the knob, it is frictionally engaged with the dial 56 and forces the dial to move until the null point is reached. The cubic feet per minutes being delivered is then represented by the figure in the outer indicia corresponding to the marker 61 on the spacer 53.

It will be noted that, on the inner circle of indicia, there is a long mark surmounted by a V at the 183 division or mark. When the knob marker 58 is set at this point, the reading on the outer dial, when the vane is brought to the null point, will indicate true air velocity through the duct. Without the actual cross bars of the usual grill structure, true air velocity would be indicated by the outer indicia when the instrument is held across an open duct of 144 square inches in cross section. It has been found that generally normal grills are approximately 75% effective. It has been further ascertained empirically that, in the normal grill as supplied by grill manufacturers, it takes 183 square inches of grill surface to transmit the volume of air which would be transmitted by an open duct of 144 square inches cross section. Thus, the difference between 183 and 144 may be termed the "Grill Factor." This may be expressed as a percentage, e.g., 27.8%. Where the grill transmission efficiency varies considerably from the usual approximate 75%, the actual figure can be obtained from the manufacturer, or measured, and the value 183 recalculated for its true value to be used in setting the knob for a value corresponding to 144 square inches of open duct.

Where, as in FIG. 1, the size of the instrument approximates the size of the grill, usually only one reading in one position is necessary as the instrument inherently averages the flow across its length. In the case of a large grill, various readings may be taken in several locations and the average of the readings used for the air volume flow. As can be appreciated, this integrating or self-averaging feature of our invention is not only novel but is very important to its operation. As is well known, the velocity of fluid flow across the diameter of a duct varies from a minimum at the walls to a maximum at the center. Since the actual volume of flow is a product of the duct cross section and the true average velocity of the fluid passing through the duct, the determination of the truly representative velocity is all important. This feature is inherently incorporated in our instrument by the length and configuration of the vane and the use of the null method wherein the vane starts from a predetermined mark and, being subjected to air flow, is brought back to the mark whereupon a reading is obtained either in cubic feet per minute or feet per minute as the case may be.

As will be appreciated from the above description, another novel and important feature of our invention is the use of logarithmetic scales to represent our factors which are obtained by multiplication. Thus, grill size is a product of length times breadth or height and width while volume of air is a product of air velocity and the cross section of the duct or the area of the grill.

While our invention has been described principally in connection with air flow through ventilation ducts, it is obvious that is applicable to any type of equipment utilizing a gaseous medium wherein the knowledge of the quantity of flow per predetermined unit is desired.

Obviously many modifications and variations of the present invention are possible in the light of the above teachings. It is therefore to be understood that within the scope of the appended claims the invention may be practiced otherwise than as specifically described.

What is claimed is:

1. A flowmeter for measuring the flow rate of gaseous fluid issuing from a duct covered by a protective grill comprising, a housing having a partially open base adapted to be placed on said grill including means for directing the flow of a portion of said gaseous fluid through a selected portion of the housing, movable damper plate means for controlling the flow of gaseous fluid through said housing, vane means rotatably suspended in said housing in the path of the directed flow of gaseous fluid, the rotatable suspension means for said vane including an adjustable torsion spring for restraining rotational movement of the vane from a null rest position, and calibrated measurement means provided for both adjusting the said torsion spring to increase its restoring force and for simultaneously adjusting said movable damper plate means to vary the flow of gaseous fluid through said housing, whereby the said vane is restored from a position deflected by flow of gaseous fluid through the housing to the position of null measurement.

2. A flowmeter in accordance with claim 1 wherein said variable measurement means is calibrated to read volume flow.

3. A flowmeter in accordance with claim 2 wherein said variable measurement means is calibrated to read flow velocity.

References Cited by the Examiner

UNITED STATES PATENTS

| 3,040,939 | 6/1962 | McCollough | 251—251 X |
| 3,090,231 | 5/1963 | Elkstrom | 73—228 |

FOREIGN PATENTS 16,845   8/1897   Great Britain.

RICHARD C. QUEISSER, *Primary Examiner.*

E. D. GILHOOLY, *Assistant Examiner.*